(12) United States Patent
Shimada

(10) Patent No.: US 10,910,001 B2
(45) Date of Patent: Feb. 2, 2021

(54) VOICE RECOGNITION DEVICE, ROBOT, VOICE RECOGNITION METHOD, AND STORAGE MEDIUM

(71) Applicant: CASIO COMPUTER CO., LTD., Tokyo (JP)

(72) Inventor: Keisuke Shimada, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 137 days.

(21) Appl. No.: 16/231,518

(22) Filed: Dec. 23, 2018

(65) Prior Publication Data
US 2019/0198044 A1    Jun. 27, 2019

(30) Foreign Application Priority Data

Dec. 25, 2017  (JP) .................. 2017-247211
Jun. 21, 2018  (JP) .................. 2018-117630

(51) Int. Cl.
| | | |
|---|---|---|
| *G10L 25/84* | (2013.01) | |
| *G10L 21/0224* | (2013.01) | |
| *G10L 15/25* | (2013.01) | |
| *G10L 15/20* | (2006.01) | |
| *G06K 9/00* | (2006.01) | |
| *G10L 17/02* | (2013.01) | |

(52) U.S. Cl.
CPC .............. *G10L 25/84* (2013.01); *G06K 9/00* (2013.01); *G10L 15/20* (2013.01); *G10L 15/25* (2013.01); *G10L 17/02* (2013.01); *G10L 21/0224* (2013.01)

(58) Field of Classification Search
CPC ......... G10L 25/84; G10L 15/20; G10L 15/25; G10L 17/02; G10L 21/0224; G10L 15/197; G10L 15/02; G10L 15/063; G10L 21/0316; G10L 25/21; G10L 25/24; G06K 9/00; G06N 3/0445; G06N 3/08
See application file for complete search history.

(56) References Cited

U.S. PATENT DOCUMENTS

| | | | |
|---|---|---|---|
| 5,305,422 A | 4/1994 | Junqua | |
| 6,366,885 B1* | 4/2002 | Basu .................... | G11B 27/031 704/235 |
| 6,665,643 B1* | 12/2003 | Lande .................... | G06T 9/001 345/474 |

(Continued)

FOREIGN PATENT DOCUMENTS

| | | |
|---|---|---|
| JP | 63038993 A | 2/1988 |
| JP | H06507507 A | 8/1994 |

(Continued)

OTHER PUBLICATIONS

Japanese Office Action dated Dec. 10, 2019 (and English translation thereof) issued in Japanese Patent Application No. 2018-117630.

*Primary Examiner* — Mohammad K Islam
(74) *Attorney, Agent, or Firm* — Holtz, Holtz & Volek PC (57) ABSTRACT

A voice recognition device including: a recognizer which recognizes a movement of a mouth of an utterer; a detector which detects a noise among a sound around the device; and a controller which controls a voice recognition timing based on the movement of the mouth of the utterer recognized by the recognizer and the noise among the sound around the device detected by the detector.

14 Claims, 7 Drawing Sheets

(56) References Cited

U.S. PATENT DOCUMENTS

| | | | | |
|---|---|---|---|---|
| 6,813,607 | B1* | 11/2004 | Faruquie | G10L 21/06 704/258 |
| 7,015,947 | B1* | 3/2006 | Hollier | H04N 17/00 348/180 |
| 7,860,718 | B2 | 12/2010 | Lee et al. | |
| 9,009,048 | B2* | 4/2015 | Jang | G10L 15/04 704/211 |
| 9,355,649 | B2* | 5/2016 | King | G11B 27/10 |
| 9,479,736 | B1* | 10/2016 | Karakotsios | H04N 7/157 |
| 9,595,271 | B2* | 3/2017 | Thapliyal | H04N 7/15 |
| 9,613,450 | B2* | 4/2017 | Wang | G06T 13/40 |
| 9,754,193 | B2* | 9/2017 | Ramachandrula | G06K 9/00892 |
| 9,922,665 | B2* | 3/2018 | Matthews | G10L 21/10 |
| 10,511,908 | B1* | 12/2019 | Fisher | H04R 3/04 |
| 2002/0097380 | A1* | 7/2002 | Moulton | G11B 27/028 352/5 |
| 2003/0137515 | A1* | 7/2003 | Cederwall | G06T 13/40 345/473 |
| 2005/0162432 | A1* | 7/2005 | Ballin | G06T 13/20 345/473 |
| 2007/0136071 | A1 | 6/2007 | Lee et al. | |
| 2008/0259085 | A1* | 10/2008 | Chen | G06T 13/40 345/473 |
| 2012/0035927 | A1* | 2/2012 | Yamada | G10L 25/78 704/242 |
| 2013/0195428 | A1* | 8/2013 | Marks | G11B 27/036 386/278 |
| 2013/0304587 | A1* | 11/2013 | Ralston | G06Q 30/0271 705/14.67 |
| 2015/0036856 | A1* | 2/2015 | Pruthi | H04R 25/505 381/317 |
| 2015/0120304 | A1 | 4/2015 | Yamashita et al. | |
| 2015/0134330 | A1* | 5/2015 | Baldwin | G10L 17/06 704/232 |
| 2015/0331490 | A1 | 11/2015 | Yamada | |
| 2016/0203827 | A1* | 7/2016 | Leff | G06T 13/40 704/207 |
| 2017/0053665 | A1* | 2/2017 | Quatieri, Jr. | G10L 25/66 |
| 2017/0154457 | A1* | 6/2017 | Theobald | G06T 13/205 |
| 2017/0309296 | A1* | 10/2017 | Sun | H04N 21/44028 |
| 2018/0096677 | A1* | 4/2018 | Pollet | G06N 3/02 |
| 2018/0174600 | A1* | 6/2018 | Chaudhuri | G06K 9/00765 |
| 2018/0206638 | A1* | 7/2018 | Spofford | F16M 7/00 |
| 2018/0253881 | A1* | 9/2018 | Edwards | G10L 21/10 |
| 2018/0276569 | A1* | 9/2018 | Oguri | G10L 15/02 |
| 2018/0285456 | A1* | 10/2018 | Nichkawde | A63F 13/00 |
| 2018/0350382 | A1* | 12/2018 | Bullough | G10L 21/0232 |
| 2019/0019508 | A1* | 1/2019 | Rochford | G06F 3/0346 |
| 2019/0057714 | A1* | 2/2019 | Scholar | G10L 21/10 |
| 2019/0122092 | A1* | 4/2019 | Haines | G06F 11/3452 |
| 2019/0147838 | A1* | 5/2019 | Serletic, II | G10L 13/027 704/260 |
| 2019/0164156 | A1* | 5/2019 | Lindemann | H04L 9/0825 |
| 2019/0187785 | A1* | 6/2019 | Kim | G06F 3/01 |
| 2019/0189145 | A1* | 6/2019 | Rakshit | G10L 21/0364 |
| 2019/0279642 | A1* | 9/2019 | Shukla | G10L 15/22 |
| 2020/0105262 | A1* | 4/2020 | Abhinav | G10L 15/02 |
| 2020/0170622 | A1* | 6/2020 | Dhatt | G06N 3/04 |
| 2020/0193992 | A1* | 6/2020 | Kim | H04N 5/232 |

FOREIGN PATENT DOCUMENTS

| | | |
|---|---|---|
| JP | 2007156493 A | 6/2007 |
| JP | 2007199552 A | 8/2007 |
| JP | 2011059186 A | 3/2011 |
| JP | 2011191423 A | 9/2011 |
| JP | 2014153663 A | 8/2014 |
| JP | 2015111253 A | 6/2015 |
| JP | 5797009 B2 | 10/2015 |

* cited by examiner

VOICE RECOGNITION DEVICE, ROBOT, VOICE RECOGNITION METHOD, AND STORAGE MEDIUM

CROSS-REFERENCE TO RELATED APPLICATIONS

The entire disclosures of Japanese Patent Application No. 2017-247211 filed on Dec. 25, 2017 and Japanese Patent Application No. 2018-117630 filed on Jun. 21, 2018 including descriptions, claims, drawings, and abstracts are incorporated herein by reference in its entirety.

BACKGROUND OF THE INVENTION

1. Field of the Invention

The present invention relates to a voice recognition device, a robot, a voice recognition method, and a storage medium.

2. Description of Related Art

There has been conventionally known a voice recognition device which recognizes human voice or the like as described in Japanese Patent Application Laid Open Publication No. 2014-153663. By the voice recognition device recognizing the human voice or the like, it is possible to convert the spoken words into a character string and identify the person who let out the voice, from the features of the voice. As for this voice recognition device, there is disclosed, as a previous step of the voice recognition, a technique of expecting generation of a timing gap between the timing when the utterer opens the mouth and the timing when the utterance actually starts, for example, and uniformly setting an adjustment amount of the timing gap in advance.

SUMMARY OF THE INVENTION

According to an aspect of the present invention, there is provided a voice recognition device including: a recognizer which recognizes a movement of a mouth of an utterer; a detector which detects a noise among a sound around the device; and a controller which controls a voice recognition timing based on the movement of the mouth of the utterer recognized by the recognizer and the noise among the sound around the device detected by the detector.

According to an aspect of the present invention, there is provided a voice recognition method including: recognizing a movement of a mouth of an utterer; detecting a voice of the utterer among a sound around a device; and controlling a voice recognition timing based on the movement of the mouth of the utterer recognized by the recognizing and the voice of the utterer among the sound around the device detected by the detecting, wherein in the controlling, the voice recognition timing is controlled based on the movement of the mouth of the utterer recognized by the recognizing and the voice of the utterer detected by the detecting.

According to an aspect of the present invention, there is provided a voice recognition method which is executed by a voice recognition device, the method including: recognizing a movement of a mouth of an utterer; detecting a noise among a sound around the device; and controlling a voice recognition timing based on the movement of the mouth of the utterer recognized by the recognizing and the noise among the sound around the device detected by the detecting.

According to an aspect of the present invention, there is provided a non-transitory storage medium storing a program which is readable by a computer, the program causing the computer to function as: a recognizer which recognizes a movement of a mouth of an utterer; a detector which detects a noise among a sound around a device; and a controller which controls a voice recognition timing based on the movement of the mouth of the utterer recognized by the recognizer and the noise among the sound around the device detected by the detector.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein.

DETAILED DESCRIPTION OF THE PREFERRED EMBODIMENT

Hereinafter, embodiments according to a voice recognition device, a robot, a voice recognition method, and a storage medium of the present invention will be described with reference to the drawings. The following description will be made by assuming that the voice recognition device of the present invention is a robot which can perform voice recognition while photographing a user (utterer).

Embodiment 1

[Configuration of Voice Recognition Device 100]

Figure 1:
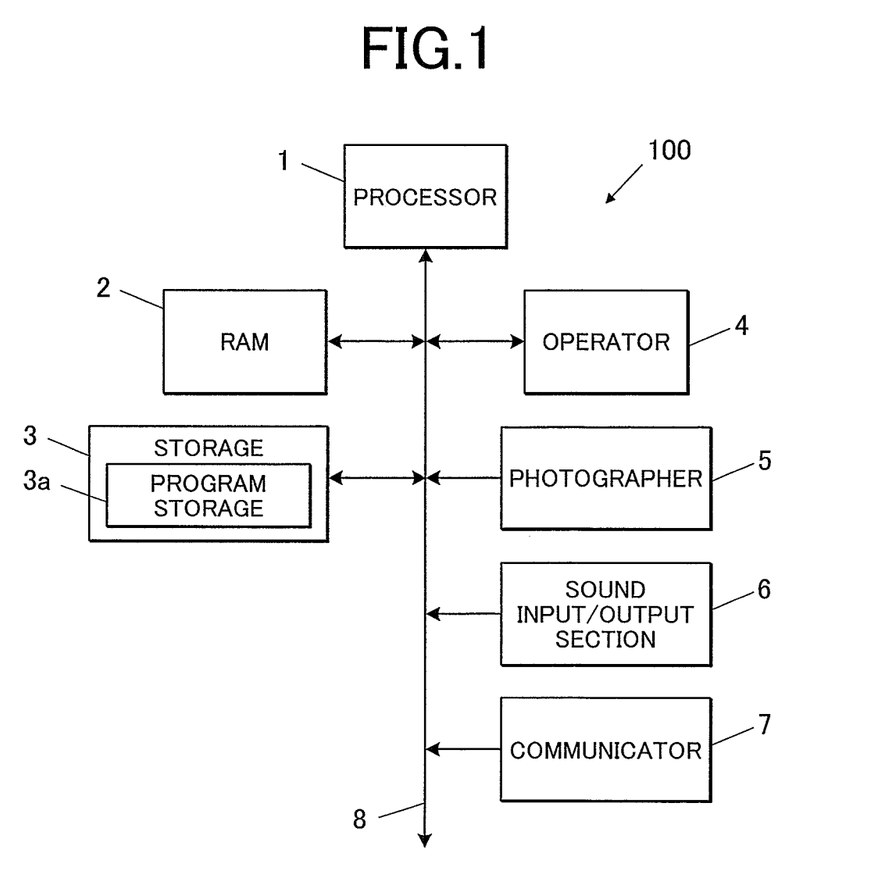
FIG. 1 is a block diagram showing a schematic configuration of a voice recognition device to which the present invention is applied.

FIG. 1 is a block diagram showing a functional configuration of a voice recognition device 100 in the embodiment.

As shown in FIG. 1, the voice recognition device 100 includes a processor 1, a RAM 2, a storage 3, an operator 4, a photographer 5, a sound input/output section 6 and a communicator 7. The components in the voice recognition device 100 are connected to each other via a bus 8.

The processor (recognizer, detector, controller and adjuster) 1 reads out a system program and an application program stored in a program storage 3a of the storage 3, uploads them onto a working area of the RAM 2 and controls the operation of each component of the voice recognition device 100 in accordance with the program.

The RAM 2 is a volatile memory, for example, and has a working area which temporarily stores various programs and data read from the processor 1.

The storage 3 is configured by including an HDD (Hard Disk Drive), an SSD (Solid State Drive), an EEPROM (Electrically Erasable Programmable Read Only Memory), a flash memory and the like, for example.

The storage 3 includes the program storage 3a. In the program storage 3a, system programs executed by the processor 1, processing programs for executing various types of processing, data necessary for executing these programs, and the like are stored.

The operator 4 is for inputting various instructions to the main body of the voice recognition device 100. In detail, the operator 4 includes, for example, a power button to turn on or off the main body of the voice recognition device 100, cursor buttons for selection instruction of a mode, a function or the like and a determination button (all of them omitted in the drawings).

When the user operates any of various types of buttons, the operator 4 outputs the operation instruction corresponding to the operated button to the processor 1. The processor 1 causes each component to execute a predetermined operation in accordance with the operation instruction which was output and input from the operator 4.

The photographer 5 photographs the user as a target of the voice recognition and generates a photographed image. Though not shown in the drawings, the photographer 5 includes a camera which includes an optical system and image capturing elements, and a photographing controller which controls the camera. The image capturing elements are, for example, an image sensor such as a CCD (Charge Coupled Device) and a CMOS (Complementary Metal Oxide Semiconductor). The image capturing elements convert an optical image which passed through the optical system into a two-dimensional image signal. The optical system of the camera is directed in a direction capable of photographing, from a front side, the user facing the voice recognition device 100 which is the robot.

The sound input/output section 6 is configured by including a sound inputter such as a microphone and an AD convertor, and a sound outputter such as a DA convertor, an amplifier and a speaker. The sound input/output section 6 receives input of the voice of the user and the surrounding sound from the microphone at the time of sound input, converts the sound input signal into digital sound input information to output the information to the processor 1. At the time of sound output, the sound input/output section 6 converts the sound output signal into an analog sound output signal to output the sound from a speaker.

The communicator 7 is configured by including, for example, a network card, a modem, a TA, a router and the like. The communicator 7 may be configured to include an antenna, a modulation and demodulation circuit, a signal processing circuit and the like so as to be able to perform wireless communication. The communicator 7 is communicably connected with an external device such as a server on a communication network and performs data transmission and reception.

The illustration and description of other components such as a driver in the voice recognition device 100 as a robot are omitted.

[Operation of Voice Recognition Device 100]

Next, the operation of the voice recognition device 100 in the embodiment will be described.

<Voice Recognition Processing>

Figure 2:
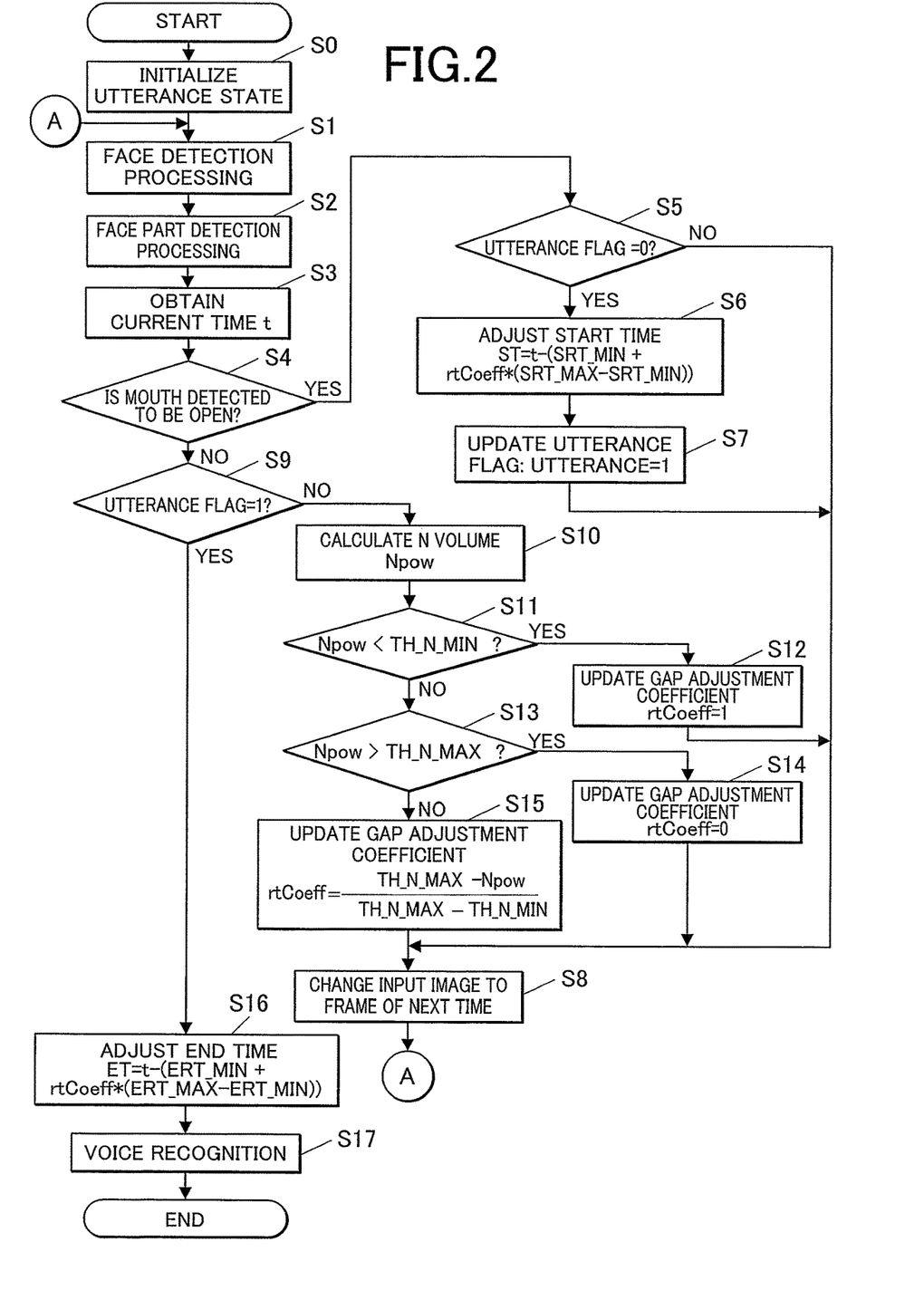
FIG. 2 is a flowchart showing an example of voice recognition processing in Embodiment 1.

FIG. 2 is a flowchart showing voice recognition processing. The voice recognition processing is executed by a trigger that the execution instruction of the voice recognition processing was input via the operator 4. In accordance with the start of the voice recognition processing, generation of the photographed image by the photographer 5 and input of sound by the sound input/output section 6 are sequentially performed.

As shown in FIG. 2, the processor 1 first initializes the utterance state (step S0). In detail, the processor 1 sets an utterance flag, which indicates whether the user is uttering, to 0.

Next, the processor 1 uses the photographed image (first frame image) generated by the photographer 5 and performs face detection processing of a user (utterer) who is a target of the voice recognition (step S1). Since the face detection processing can be performed by using a known technique, the detailed explanation thereof is omitted.

The processor 1 detects a part (for example, upper lip and lower lip) of the face detected in step S1 from above the photographed image (step S2). Since the face part detection processing can be performed by using a known technique, the detailed explanation thereof is omitted.

The processor 1 obtains current time t (step S3), and determines a mouth opening/closing state from the coordinate positions of the part (for example, upper lip and lower lip) on the photographed image (lip image) detected in step S2 (step S4).

In step S4, if it is determined that the mouth is open (step S4; YES), the processor 1 determines whether the utterance flag indicating whether the user is uttering is 0 (whether the utterance flag is in an off state) (step S5).

In step S5, if it is determined that the utterance flag is 0, that is, the user is not uttering (step S5; YES), the processor 1 recognizes that it is the timing of utterance start, and adjusts utterance start time ST (=t−(SRT_MIN+rtCoeff× (SRT_MAX−SRT_MIN))) (step S6). Here, [t] is the current time which was obtained in step S3. [SRT_MAX] is a constant indicating a maximum marginal time, and a value which is set to have a sufficient time so that the beginning of the utterance is not out of the voice recognition. [SRT_MIN] is a constant indicating a minimum marginal time, and is a value which is set so that the utterance start time ST adjusted in step S6 is immediately before the actual utterance start time. [rtCoeff] is an adjustment coefficient which is set according to the volume of the sound (noise) around the voice recognition device 100 (see steps S11 to S15).

The processor 1 updates the utterance flag to 1 (on state) (step S7). The processor 1 obtains the photographed image (frame image) of the next time (step S8), and returns to step S1.

In step S5, if it is determined that the utterance flag is not 0, that is, the user is uttering (step S5; NO), the processor 1 skips steps S6 and S7 and proceeds to step S8.

In step S4, if it is determined that the mouth is not open (step S4; NO), the processor 1 determines whether the utterance flag is 1 (whether the utterance flag is in an on state) (step S9).

In step S9, if it is determined that the utterance flag is not 1, that is, the user is not uttering (step S9; NO), the processor 1 calculates a noise volume (N volume (Npow)) around the voice recognition device 100 from the sound input signal which was input from the microphone of the sound input/ output section 6 (step S10). As a method for calculating the noise volume, the noise volume may be calculated by a moving average of the sound input signals which were input during a certain time in the past, or may be calculated by a weighted moving average in a case where the user wishes to increase the influence of the most recent noise volume. Here, as the noise to calculate the noise volume, the target is only the sound (for example, a voice of a person other than the user (utterer) and a sound other than the human voice) which is within the frequency range (for example, 100 to 1000 Hz (frequency of human voice)) of the voice of the user (voice recognition target) (the same applies to after-mentioned Embodiment 2 and a modification example of Embodiment 2). In such a way, only the sound within the frequency range of the voice of the user (utterer) is assumed to be the noise, and the sound out of the frequency range of the voice of the user is out of the target of noise, since the sound out of the frequency range of the voice of the user is obviously different from the human voice and less likely to cause the decrease in accuracy of voice recognition.

The processor 1 determines whether the noise volume (Npow) calculated in step S10 is smaller than a first threshold (TH_N_MIN) (step S11).

Figure 3:
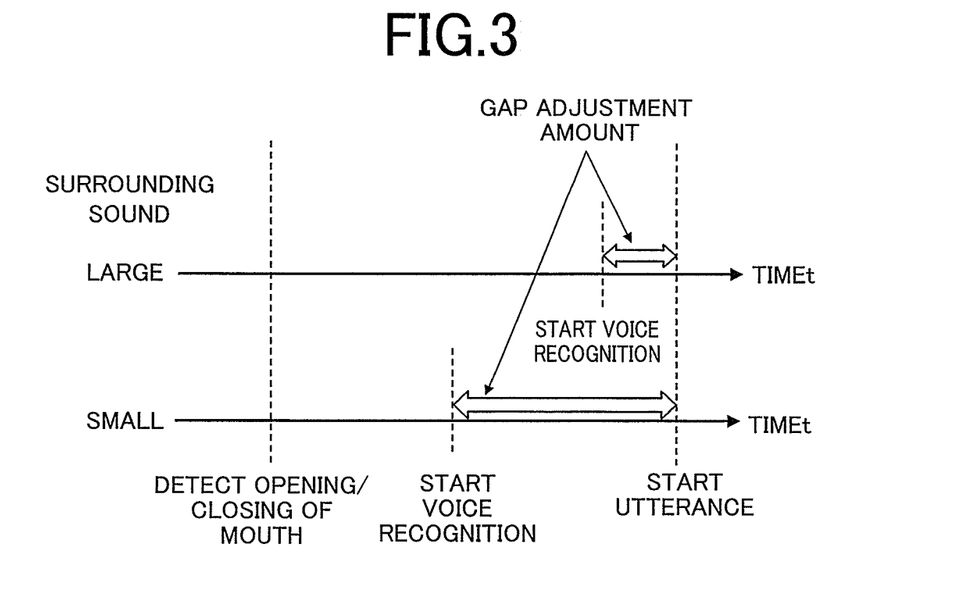
FIG. 3 is a timing chart showing a start timing of voice recognition for each of a case where surrounding sound is large and a case where the surrounding sound is small.

In step S11, if it is determined that the noise volume (Npow) is smaller than the first threshold (TH_N_MIN) (step S11; YES), the processor 1 updates the adjustment coefficient (rtCoeff) to 1 (step S12). That is, since the voice of the utterer and the surrounding sound are not easily combined when the surrounding sound (noise) of the voice recognition device 100 is small, the voice recognition is started largely before the actual start time of the utterance by increasing the gap adjustment amount as shown in FIG. 3. The processor 1 then proceeds to step S8.

On the other hand, in step S11, if is it determined that the noise volume (Npow) is the first threshold (TH_N_MIN) or more (step S11; NO), the processor 1 determines whether the noise volume (Npow) is larger than a second threshold (TH_N_MAX) (step S13).

In step S13, if it is determined that the noise volume (Npow) is larger than the second threshold (TH_N_MAX) (step S13; YES), the processor 1 updates the adjustment coefficient (rtCoeff) to 0 (step S14). That is, since the voice of the utterer and the surrounding sound are easily combined when the surrounding sound (noise) of the voice recognition device 100 is large, the voice recognition is started immediately before the actual start time of the utterance by decreasing the gap adjustment amount as shown in FIG. 3. The processor 1 then proceeds to step S8.

On the other hand, in step S13, if it is determined that the noise volume (Npow) is not larger than the second threshold (TH_N_MAX) (step S13; NO), the processor 1 updates the adjustment coefficient (rtCoeff) on the basis of the formula of rtCoeff=(TH_N_MAX−Npow)/(TH_N_MAX−TH_N_MIN) (step S15), and proceeds to step S8.

In step S9, if it is determined that the utterance flag is 1, that is, the user is uttering (step S9; YES), the processor 1 recognizes that it is the timing of utterance end, and performs adjustment of the utterance end time ET (=t−(ERT_MIN+rtCoeff×(ERT_MAX−ERT_MIN))) (step S16). Here, [t] is the current time which was obtained in step S3. [ERT_MAX] is a constant indicating a maximum marginal time, and a value which is set to have a sufficient time so that the end portion of the utterance is not out of the voice recognition. [ERT_MIN] is a constant indicating a minimum marginal time, and is a value which is set so that the utterance end time ET adjusted in step S16 is immediately after the actual utterance end time. [rtCoeff] is an adjustment coefficient which is set according to the volume of the sound (noise) around the voice recognition device 100 (see steps S11 to S15).

The processor 1 performs voice recognition to the sound for the interval (voice recognition interval) from the utterance start time ST adjusted in step S6 to the utterance end time ET adjusted in step S16 among the sounds which were input by the sound input/output section 6 (step S17), and ends the voice recognition processing.

As described above, the voice recognition device 100 in the embodiment recognizes the movement of the mouth of the user (utterer), detects the sound around the device, and controls the voice recognition timing on the basis of the movement of the mouth of the user and the sound around the device. Thus, it is possible to decrease the influence by the sound around the device on the accuracy of the voice recognition. The timing indicated by the voice recognition timing is not limited to one moment (one time point), and includes a predetermined period (interval from the timing of utterance start to the timing of utterance end).

The voice recognition device 100 in the embodiment recognizes the timing of utterance start of user and the timing of utterance end as the movement of the mouth from the lip image of the user. Thus, it is possible to reduce the gap from the actual utterance timing, and more reduce the influence of the sound around the device on the accuracy of the voice recognition.

The voice recognition device 100 in the embodiment adjusts the timing of utterance start and the timing of utterance end on the basis of the sound around the device, and treats the adjusted timing of utterance start as the start timing of the voice recognition and treats the adjusted timing of utterance end as the end timing of the voice recognition. Thus, it is possible to suppress the troubles such as combination with the sound around the device and loss of the sound at the beginning of the utterance, and it is possible to improve the accuracy of the voice recognition.

The voice recognition device 100 in the embodiment detects the volume of the sound around the device and controls the voice recognition timing on the basis of the volume of the sound around the device. Thus, it is possible to more reduce the influence of the sound around the device on the accuracy of the voice recognition.

In the voice recognition device 100 in the embodiment, in a case where the volume of the sound around the device is a predetermined threshold or more, the adjustment amounts of the timing of utterance start and the timing of utterance end are smaller than a case where the volume of the sound is smaller than the predetermined threshold.

Thus, since the adjustment amounts of the timing of utterance start and the timing of utterance end are made small when the sound around the device is large, it is possible to reduce the possibility that the sound around the device is combined with the utterance voice, and it is possible to reduce the influence of the sound around the device on the accuracy of the voice recognition.

Embodiment 2

Hereinafter, Embodiment 2 of the present invention will be described.

The configuration in Embodiment 2 is similar to that of Embodiment 1 except that the program storage 3a of the storage 3 in the voice recognition device 100 stores a program for executing the voice recognition processing in the embodiment and the storage 3 stores a face database and an individual gap adjustment amount database. Thus, the explanation thereof is omitted, and hereinafter, the operation of Embodiment 2 will be described.

<Voice Recognition Processing>

Figure 4:
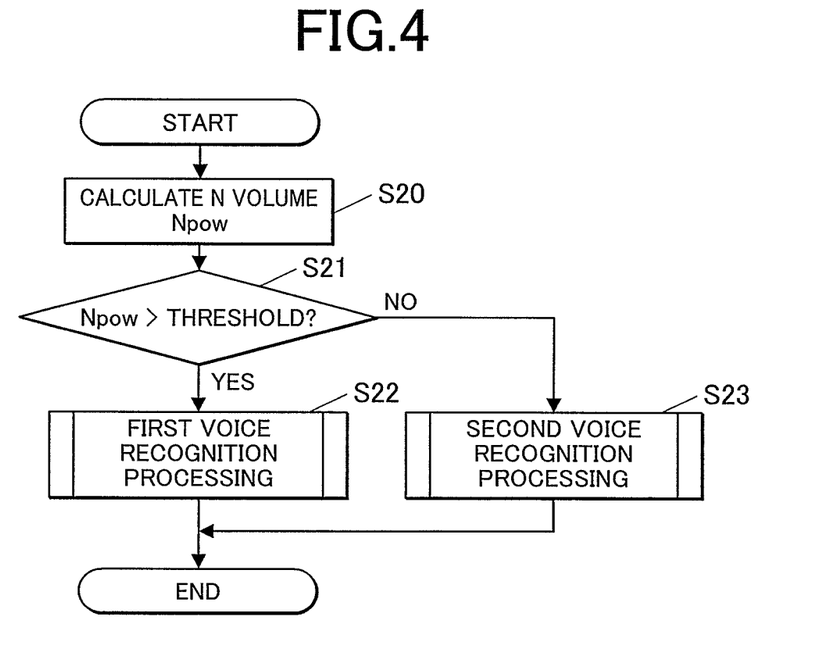
FIG. 4 is a flowchart showing an example of voice recognition processing in Embodiment 2.

FIG. 4 is a flowchart showing voice recognition processing in Embodiment 2.

As shown in FIG. 4, the processor 1 first calculates the noise volume (N volume (Npow)) around the voice recognition device 100 from the sound input signal which was input from the microphone of the sound input/output section 6 (step S20).

The processor 1 determines whether the noise volume (Npow) calculated in step S20 is larger than a predetermined threshold (step S21).

In step S21, if it is determined that the noise volume (Npow) is larger than the predetermined threshold (step S21; YES), the processor 1 executes after-mentioned first voice recognition processing (step S22), and ends the voice recognition processing.

On the other hand, in step S21, if it is determined that the noise volume (Npow) is not larger than the predetermined threshold (step S21; NO), the processor 1 executes second voice recognition processing and ends the voice recognition processing. Since the second voice recognition processing is similar to the voice recognition processing described in Embodiment 1, the description thereof is omitted.

<First Voice Recognition Processing>

Figure 5:
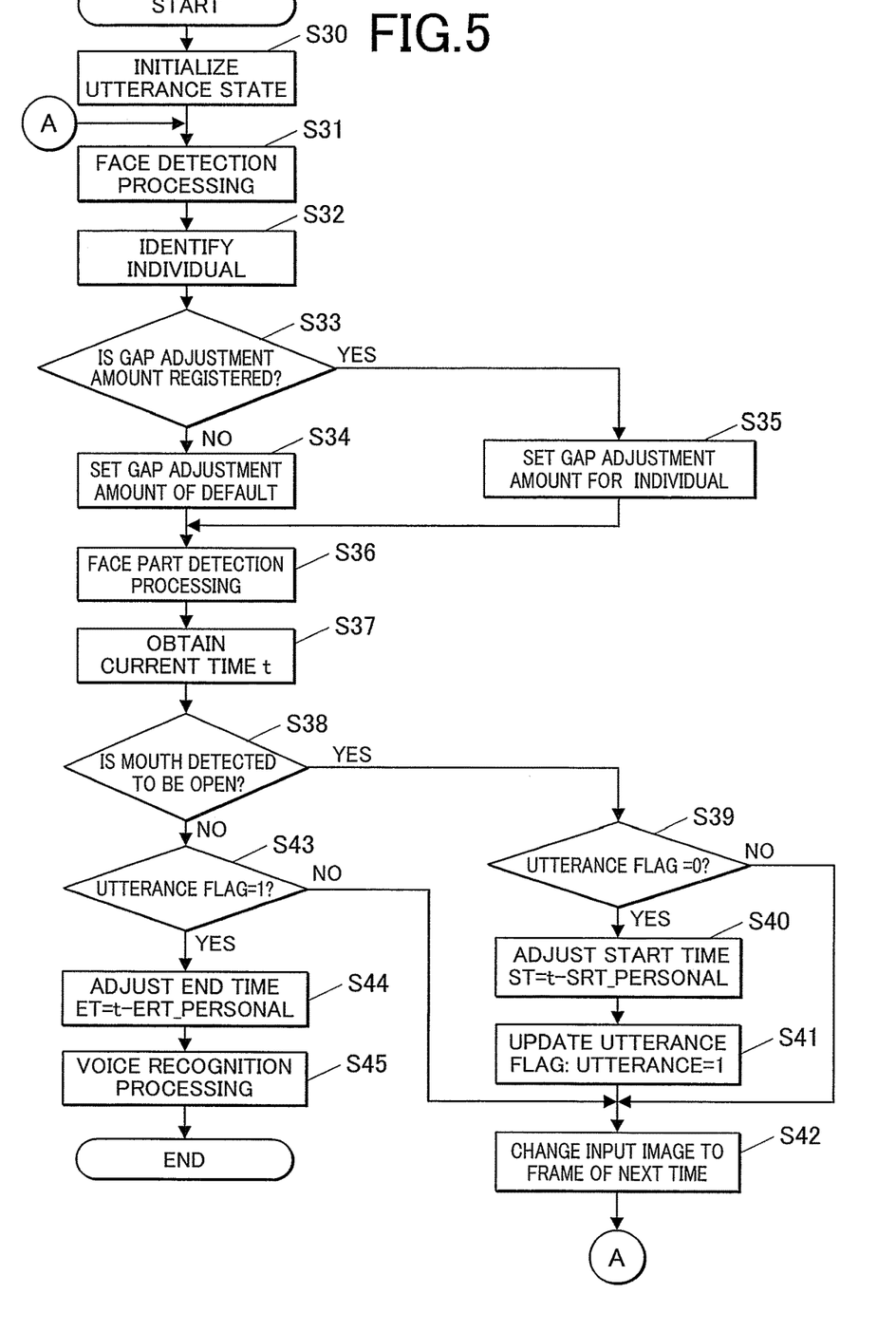
FIG. 5 is a flowchart showing an example of first voice recognition processing in Embodiment 2.

FIG. 5 is a flowchart showing the first voice recognition processing.

As shown in FIG. 5, the processor 1 first initializes the utterance state (step S30). In detail, the processor 1 sets an utterance flag, which indicates whether the user is uttering, to 0.

Next, the processor 1 uses the photographed image (first frame image) generated by the photographer 5 and performs face detection processing of the user (utterer) who is a target of the voice recognition (step S31).

The processor 1 performs individual identification processing (step S32) for the face detected in step S31 by using the face database stored in the storage 3. Since the individual identification processing can be performed by using a known technique, the description thereof is omitted.

The processor 1 determines whether the gap adjustment amount corresponding to the individual ID identified by the individual identification processing (step S32) is registered in the individual gap adjustment amount database (step S33).

In step S33, if it is determined that the gap adjustment amount corresponding to the individual ID is not registered in the individual gap adjustment amount database (step S33; NO), the processor 1 sets the gap adjustment amount of default (step S34). In detail, the processor 1 sets the gap adjustment amount (SRT_PERSONAL=default value) at the time of adjusting the gap of the utterance start time ST, and sets the gap adjustment amount (ERT_PERSONAL=default value) at the time of adjusting the gap of the utterance end time ET.

On the other hand, in step S33, if it is determined that the gap adjustment amount corresponding to the individual ID is registered in the individual gap adjustment amount database (step S33; YES), the processor 1 sets the gap adjustment amount for the individual (step S35). In detail, the processor 1 sets the gap adjustment amount (SRT_PERSONAL=value for individual) at the time of adjusting the gap of the utterance start time ST, and the gap adjustment amount (ERT_PERSONAL=value for individual) at the time of adjusting the gap of the utterance end time ET.

The processor 1 detects a part (for example, upper lip and lower lip) from the face detected in step S31 from above the photographed image (step S36).

The processor 1 obtains current time t (step S37), and determines a mouth opening/closing state from the coordinate positions of the part (for example, upper lip and lower lip) on the photographed image (lip image) detected in step S36 (step S38).

In step S38, if it is determined that the mouth is open (step S38; YES), the processor 1 determines whether the utterance flag, which indicates whether the user is uttering, is 0 (whether the utterance flag is in the off state) (step S39).

In step S39, if it is determined that the utterance flag is 0, that is, the user is not uttering (step S39; YES), the processor 1 recognizes that it is the timing of utterance start, and adjusts utterance start time ST (=t−SRT_PERSONAL) (step S40). Here, [t] is the current time which was obtained in step S37. [SRT_PERSONAL] is a value which was set in step S34 or step S35.

The processor 1 updates the utterance flag to 1 (on state) (step S41). The processor 1 obtains the photographed image (frame image) of the next time (step S42), and returns to step S31.

In step S39, if it is determined that the utterance flag is not 0, that is, the user is uttering (step S39; NO), the processor 1 skips steps S40 and S41 and proceeds to step S42.

In step S38, if it is determined that the mouth is not open (step S38; NO), the processor 1 determines whether the utterance flag is 1 (whether the utterance flag is in the on state) (step S43).

In step S43, if it is determined that the utterance flag is not 1, that is, the user is not uttering (step S43; NO), the processor 1 proceeds to step S42.

In step S43, if it is determined that the utterance flag is 1, that is, the user is uttering (step S43; YES), the processor 1 recognizes that it is the timing of utterance end, and performs adjustment of the utterance end time ET (=t−ERT_PERSONAL) (step S44). Here, [t] is the current time which was obtained in step S37. [ERT_PERSONAL] is a value which was set in step S34 or step S35.

The processor 1 performs voice recognition to the sound for the interval (voice recognition interval) from the utterance start time ST adjusted in step S40 to the utterance end time ET adjusted in step S44 among the sounds input by the sound input/output section 6 (step S45), and ends the first voice recognition processing.

<Gap Adjustment Amount Calculation Processing>

Figure 6:
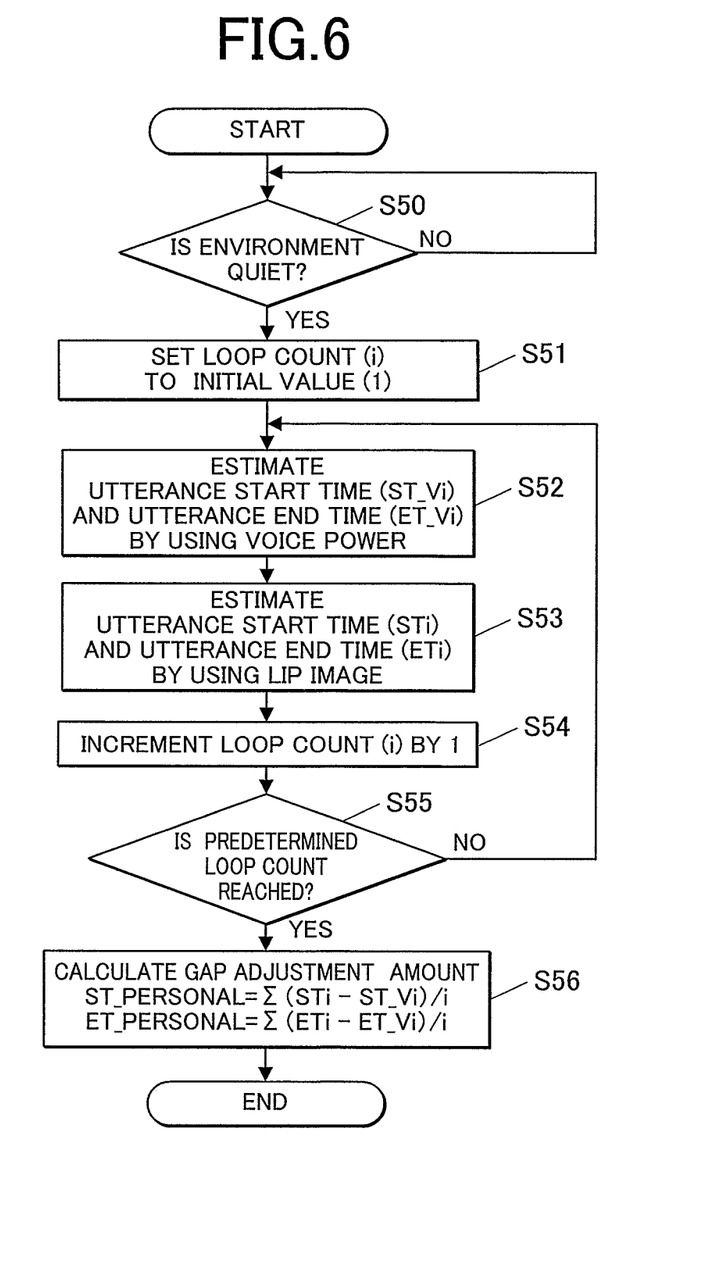
FIG. 6 is a flowchart showing an example of gap adjustment amount calculation processing in Embodiment 2.

FIG. 6 is a flowchart showing the gap adjustment amount calculation processing. The gap adjustment amount calculation processing is processing performed before the above-mentioned first voice recognition processing, and executed by a trigger that the execution instruction of the gap adjustment amount calculation processing was input via the operator 4.

As shown in FIG. 6, the processor 1 first determines whether the environment is quiet (step S50). In detail, the processor 1 calculates the noise volume (N volume (Npow)) around the voice recognition device 100 from the sound input signal which was input from the microphone of the sound input/output section 6. If the noise volume continues to be a predetermined threshold or less for a certain time, the processor 1 determines that the environment is quiet. The method for determining whether the environment is quiet is not limited to the above-mentioned method.

In step S50, if it is determined that the environment is not quiet (step S50; NO), the processor 1 repeats the process of step S50 until the environment is determined to be quiet.

On the other hand, in step S50, if it is determined that the environment is quiet (step S50; YES), the processor 1 sets the loop count (i) to an initial value (1) (step S51).

The processor 1 estimates the utterance start time (ST_Vi) and the utterance end time (ET_Vi) by using a voice power (step S52). In detail, the processor 1 calculates the voice power of the utterer from the sound input signal which was input from the microphone of the sound input/output section 6, for example, estimates the timing when the voice power becomes a predetermined threshold or more as the utterance start time (ST_Vi), and then estimates the timing when the voice power becomes the predetermined threshold or less as the utterance end time (ET_Vi). Here, the sound input signal input from the microphone of the sound input/output section 6 is a sound input signal which is input from the microphone of the sound input/output section 6 at the time of photographing the lip image used in after-mentioned step S53, and the sound input signal is synchronized with the lip image. The method for estimating the utterance start time (ST_Vi) and the utterance end time (ET_Vi) is not limited to the above-mentioned method.

The processor 1 estimates the utterance start time (STi) and the utterance end time (ETi) by using the lip image (step S53). In detail, the processor 1 determines the opening/closing state of the mouth from the coordinate positions of the part (for example, upper lip and lower lip) on the lip image similarly to step S38 of the above-mentioned first voice recognition processing, estimates the timing when the mouth is determined to be opened to be the utterance start time (STi) and then estimates the timing when the mouth is determined to be closed to be the utterance end time (ETi).

The processor 1 increments the loop count (i) by 1 (step S54), and determines whether the loop count (i) reaches a predetermined loop count (for example, 10) (step S55).

In step S55, if it is determined that the loop count (i) does not reach the predetermined loop count (step S55; NO), the processor 1 returns to step S52 and repeats the subsequent processing.

On the other hand, in step S55, if it is determined that the loop count (i) reaches the predetermined loop count (step S55; YES), the processor 1 calculates the gap adjustment amount on the basis of the following calculation formula (step S56). Here, the processor 1 functions as a calculator.

$$ST\_PERSONAL = \Sigma(STi - ST\_Vi)/i$$

$$ET\_PERSONAL = \Sigma(ETi - ET\_Vi)/i$$

The processor 1 registers the gap adjustment amount calculated in step S56 in the individual gap adjustment amount database of the storage 3 so as to be associated with the individual ID of the utterer, and ends the gap adjustment amount calculation processing.

As described above, the voice recognition device 100 in the embodiment recognizes the movement of the mouth of the user (utterer), detects the voice of the user, and controls the voice recognition timing on the basis of the movement of the mouth of the user and the voice of the user. Thus, it is possible to reduce the influence of the sound around the device on the accuracy of the voice recognition.

The voice recognition device 100 in the embodiment recognizes the timing of utterance start of the user and the timing of utterance end as the movement of the mouth from the lip image of the user. Thus, it is possible to reduce the gap from the actual utterance timing and more reduce the influence of the sound around the device on the accuracy of the voice recognition.

The voice recognition device 100 in the embodiment calculates the gap adjustment amount (SRT_PERSONAL, ERT_PERSONAL) for the individual for adjusting the gap regarding the timing of utterance start of the user and the gap regarding the timing of utterance end of the user on the basis of the detected voice of the user, and treats the timing of utterance start to which the gap adjustment amount for the individual is added as the start timing of the voice recognition and treats the timing of utterance end to which the gap adjustment amount for the individual is added as the end timing of the voice recognition. Thus, it is possible to more reduce the gap from the actual utterance timing, and further reduce the influence of the sound around the device on the accuracy of the voice recognition.

The voice recognition device 100 in the embodiment further detects the sound around the device, and if the volume of the sound around the device is a predetermined threshold or more, the voice recognition device 100 treats the timing of utterance start to which the gap adjustment amount for the individual is added as the start timing of the voice recognition, and treats the timing of utterance end to which the gap adjustment amount for the individual is added as the end timing of the voice recognition. Thus, it is possible to effectively reduce the influence of the sound around the device on the accuracy of the voice recognition.

Modification Example of Embodiment 2

Hereinafter, a modification example of Embodiment 2 of the present invention will be described.

In this modification example, the voice recognition processing is similar to that described in the above Embodiment 2 except for the respects that the processing contents of the first voice recognition processing (step S22) are different, that identifier generation processing is performed instead of the gap adjustment amount calculation processing described in the above Embodiment 2, and that an identifier database and a machine learning data set are stored in the storage 3 instead of the individual gap adjustment amount database described in Embodiment 2. Thus, the description is omitted and the operation of the modification example will be described hereinafter.

<First Voice Recognition Processing>

Figure 7:
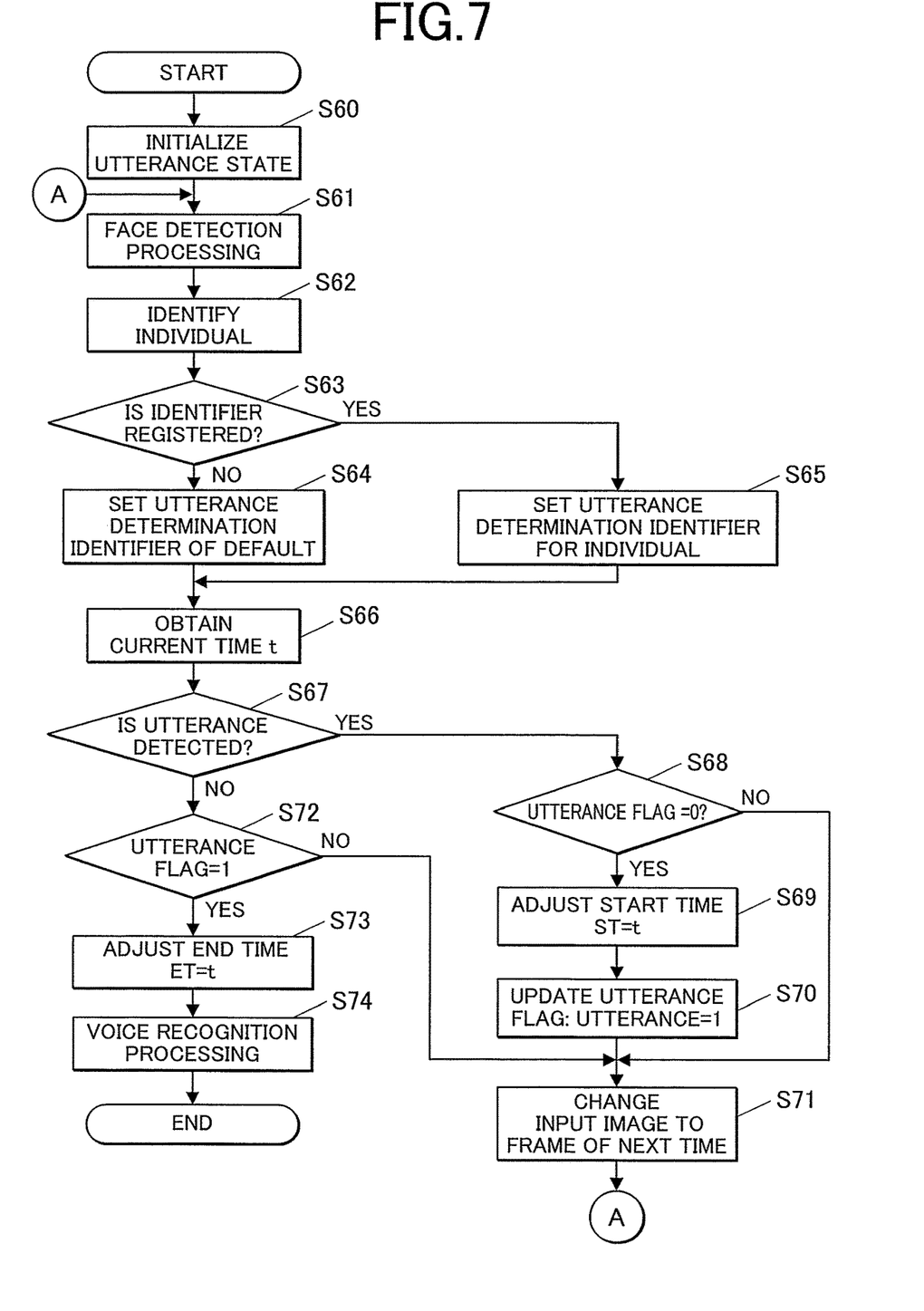
FIG. 7 is a flowchart showing an example of first voice recognition processing in a modification example of Embodiment 2.

FIG. 7 is a flowchart showing first voice recognition processing in the modification example.

As shown in FIG. 7, the processor 1 first initializes the utterance state (step S60). In detail, the processor 1 sets an utterance flag, which indicates whether the user is uttering, to 0.

Next, the processor 1 uses the photographed image (first frame image) generated by the photographer 5 and performs face detection processing of the user (utterer) who is a target of the voice recognition (step S61).

The processor 1 performs individual identification processing (step S62) for the face detected in step S61 by using the face database stored in the storage 3.

The processor 1 determines whether the utterance determination identifier corresponding to the individual ID identified by the individual identification processing (step S62) is registered in the identifier database (step S63).

In step S63, if it is determined that the utterance determination identifier corresponding to the individual ID is not registered in the identifier database (step S63; NO), the processor 1 sets the utterance determination identifier of default (step S64).

On the other hand, in step S63, if it is determined that the utterance determination identifier corresponding to the individual ID is registered in the identifier database (step S63; YES), the processor 1 sets the utterance determination identifier for the individual (step S65).

The processor 1 obtains the current time t (step S66), and determines whether the lip image (frame image) obtained by the face detection process in step S61 is an image during the utterance or an image not during the utterance by using the utterance determination identifier which was set in step S64 or step S65 (step S67). Here, the processor 1 functions as a determiner.

In step S67, if it is determined that the lip image is the image during utterance (step S67; YES), the processor 1 determines whether the utterance flag, which indicates whether the user is uttering, is 0 (whether the utterance flag is in the off state) (step S68).

In step S68, if it is determined that the utterance flag is 0, that is, the user is not uttering (step S68; YES), the processor 1 recognizes that it is the timing of utterance start, and adjusts utterance start time ST (=t) (step S69). Here, [t] is the current time which was obtained in step S66.

The processor 1 updates the utterance flag to 1 (on state) (step S70). The processor 1 obtains the photographed image (frame image) of the next time (step S71), and returns to step S61.

In step S68, if it is determined that the utterance flag is not 0, that is, the user is uttering (step S68; NO), the processor 1 skips steps S69 and S70 and proceeds to step S71.

In step S67, if it is determined that the lip image is the image not during utterance (step S67; NO), the processor 1 determines whether the utterance flag is 1 (whether the utterance flag is in the on state) (step S72).

In step S72, if it is determined that the utterance flag is not 1, that is, the user is not uttering (step S72; NO), the processor 1 proceeds to step S71.

In step S72, if it is determined that the utterance flag is 1, that is, the user is uttering (step S72; YES), the processor 1 recognizes that it is the timing of utterance end, and performs adjustment of the utterance end time ET (=t) (step S73). Here, [t] is the current time which was obtained in step S66.

The processor 1 performs voice recognition to the sound for the interval (voice recognition interval) from the utterance start time ST adjusted in step S69 to the utterance end time ET adjusted in step S73 among the sounds input by the sound input/output section 6 (step S74), and ends the first voice recognition processing.

<Identifier Generation Processing>

Figure 8:
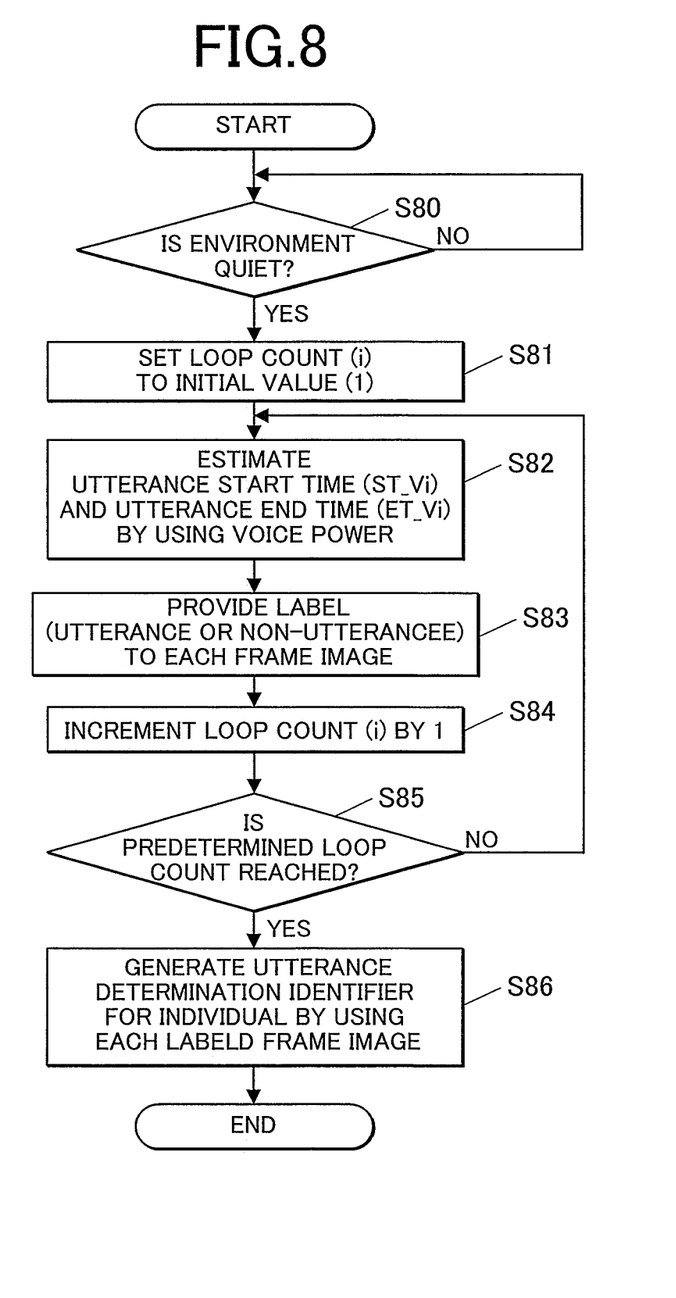
FIG. 8 is a flowchart showing an example of identifier generation processing in the modification example of Embodiment 2.

FIG. 8 is a flowchart showing the identifier generation processing. The identifier generation processing is performed before the above-mentioned first voice recognition processing and executed by a trigger that the execution instruction of the identifier generation processing was input via the operator 4.

As shown in FIG. 8, the processor 1 first determines whether the environment is quiet, similarly to the above-mentioned Embodiment 2 (step S80).

In step S80, if it is determined that the environment is not quiet (step S80; NO), the processor 1 repeats the process of step S80 until the environment is determined to be quiet.

On the other hand, in step S80, if it is determined that the environment is quiet (step S80; YES), the processor 1 sets the loop count (i) to an initial value (1) (step S81).

The processor 1 estimates the utterance start time (ST_Vi) and the utterance end time (ET_Vi) by using a voice power, similarly to the above-mentioned Embodiment 2 (step S82).

The processor 1 performs labeling indicating utterance or non-utterance to each frame image (lip image) by using the utterance start time (ST_Vi) and the utterance end time (ET_Vi) estimated in step S82 (step S83). Here, each frame image to which labeling was performed is registered in the machine leaning data set of the storage 3.

The processor 1 increments the loop count (i) by 1 (step S84), and determines whether the loop count (i) reaches a predetermined loop count (for example, 10) (step S85).

In step S85, if it is determined that the loop count (i) does not reach the predetermined loop count (step S85; NO), the processor 1 returns to step S82 and repeats the subsequent processing.

On the other hand, in step S85, if it is determined that the loop count (i) reaches the predetermined loop count (step S85; YES), the processor 1 performs machine learning by using each frame image registered in the machine leaning data set, and generates the utterance determination identifier (step S86). Here, the processor 1 functions as a generator.

The processor 1 registers the utterance determination identifier which was generated in step S86 in the identifier database of the storage 3 so as to be associated with the individual ID of the utterer, and ends the identifier generation processing.

As described above, the voice recognition device 100 in the modification example generates the utterance determination identifier for individual in advance by performing labeling of utterance or non-utterance to the lip image of the user which is synchronized with the detected voice of the user. The voice recognition device 100 determines whether the lip image of the user is an image during utterance or an image not during utterance by using the utterance determination identifier for the individual. The voice recognition device 100 recognizes the timing of utterance start of the user and the timing of utterance end as the movement of the mouth from the lip image of the user on the basis of the determination result. Thus, it is possible to reduce the gap from the actual utterance timing and more reduce the influence of the sound around the device on the accuracy of voice recognition.

The voice recognition device 100 in the modification example generates the utterance determination identifier for individual by machine learning of a plurality of lip images to which labeling of utterance or non-utterance was performed. Thus, it is possible to improve the recognition accuracy in recognizing the timing of utterance start of the user and timing of utterance end.

The voice recognition device 100 in the modification example further detects the sound around the device. If the volume of the sound around the device is a predetermined threshold or more, the voice recognition device 100 determines whether the lip image of the user is an image during utterance or an image not during utterance by using the above-mentioned utterance determination identifier, and, on the basis of the determination result, recognizes the timing of utterance start of the user and the timing of utterance end as the movement of the mouth from the lip image of the user. Thus, it is possible to reduce the gap from the actual utterance timing and effectively reduce the influence of the sound around the device on the accuracy of voice recognition.

Though the embodiments of the present invention have been described above, the present invention is not limited to such embodiments, and various modifications can be made within the scope of the invention.

For example, though the noise volume (Npow) is calculated in step S10 of voice recognition processing, the signal-to-noise ratio around the voice recognition device 100 may be calculated, for example. In this case, the adjustment coefficient (rtCoeff) is updated according to the calculated signal-to-noise ratio. As the calculation method of the noise volume, for example, the noise volume may be calculated from the MUSIC power derived by the MUSIC (Multiple Signal Classification) method which is a method of sound source localization, for example.

The gap adjustment amounts, which are used in adjusting of the utterance start time ST and the utterance end time ET, are calculated on the basis of a predetermined calculation formula (see steps S6 and S16 in FIG. 2). However, for example, a table of gap adjustment amount corresponding to large/small volume (which may be in multiple levels) of the sound around the voice recognition device 100 or corresponding to the large/small (which may be in multiple levels) of signal-to-noise ratio may be prepared in advance so that the gap adjustment amount corresponding to the degree of the surrounding sound actually measured or the degree of the signal-to-noise ratio is obtained from the table.

In the above voice recognition processing, both of the timing of utterance start and the timing of utterance end are recognized from the lip image of the utterer. However, for example, only one of the timings may be recognized from the lip image of the utterer. In such a case, the other timing is recognized by a known technique.

In the above voice recognition processing, both of the utterance start time ST and the utterance end time ET are adjusted on the basis of a predetermined calculation formula corresponding to the volume of the surrounding sound. However, for example, only one of the above times may be adjusted on the basis of the predetermined calculation formula corresponding to the volume of the surrounding sound. In such a case, the other time is adjusted by a known technique.

In step S17 of the voice recognition processing, the voice recognition is performed after specifying the utterance end time ET. However, the voice recognition may be performed at the time when the utterance start time ST was specified. In this case, after the voice recognition is started, the voice recognition is ended when the utterance end time ET is specified.

The timing of utterance start and the timing of utterance end are recognized by determining the opening/closing state of the mouth from the coordinate positions of the part (for example, upper lip and lower lip) detected in step S2 in the voice recognition processing. However, for example, the timing when the user (utterer) performed a pressing operation to a predetermined button of the operator 4 may be recognized as the timing of utterance start, and the timing when the pressing operation is released may be recognized as the timing of utterance end. The timing of utterance start and the timing of utterance end may be recognized on the basis of the change in the shape of the entire face, the gesture, expired air, muscle potential and the like, not limited to the upper and lower lips. A predetermined period during which the voice recognition device 100 is making a sign such as lighting of a lamp, for example, may be recognized as the voice recognition interval (interval from the timing of utterance start to the timing of utterance end). A zero cross number may be counted for the amplitude of the sound signal exceeding a predetermine threshold so that the timing when the count number becomes equal to or more than the specified number for one second as the timing of utterance start, and the timing when the zero cross count becomes equal to or less than the specified number as the timing of utterance end.

In Embodiment 1, whether the opening/closing of the mouth is detected is determined in step S4 of the voice recognition processing (see FIG. 2). However, for example, the determination processing in step S4 may be executed if the volume of the sound (noise) around the device is larger than a predetermined threshold, whereas, if the volume of the sound (noise) around the device is the predetermined threshold or less, the voice recognition processing may be executed without executing the determination processing in step S4, that is, without recognizing the timing of utterance start and the timing of utterance end.

In Embodiment 1, the noise volume is calculated in step S10 of the voice recognition processing (see FIG. 2). However, for example, there may be provided a noise determiner which determines whether the noise is caused by a human voice or by a sound other than the human voice so that the noise volume by the human voice is calculated if the noise is determined to be caused by the human voice, whereas, if the noise is caused by sound other than human voice, the noise volume is not calculated to skip the processes of steps S11 to step S15. The above determination by the noise determiner is performed on the basis of the frequency of the noise.

In the above Embodiment 2 and the modification example of Embodiment 2, whether to perform the first voice recognition processing or second voice recognition processing is determined according to the volume of the sound (noise) around the device. However, the first voice recognition processing may be always performed regardless of the volume of the sound around the device.

Though embodiments of the present invention have been described above, the scope of the present invention is not limited to the above embodiments, and includes the scope of inventions, which is described in the scope of claims, and the scope equivalent thereof.

What is claimed is:

1. A voice recognition device comprising:
   a recognizer which recognizes a movement of a mouth of an utterer;
   a detector which detects a noise among a sound around the device;
   a calculator which calculates a gap adjustment amount for adjusting a gap regarding a timing of utterance start of the utterer and/or a gap regarding a timing of utterance end of the utterer based on the noise among the sound around the device detected by the detector; and
   a controller which controls a voice recognition timing based on the movement of the mouth of the utterer recognized by the recognizer and the noise among the sound around the device detected by the detector,
   wherein the controller determines the timing of utterance start, to which the gap adjustment amount calculated by the calculator is added, as a start timing of voice recognition, and determines the timing of utterance end, to which a gap adjustment amount is added, as an end timing of the voice recognition.

2. The voice recognition device according to claim 1, wherein the recognizer recognizes at least one of the timing of utterance start and the timing of utterance end based on the movement of the mouth from a lip image of the utterer.

3. The voice recognition device according to claim 1, wherein:
   the detector detects a volume of the noise among the sound around the device, and
   the controller controls the voice recognition timing based on the volume of the noise among the sound around the device detected by the detector.

4. The voice recognition device according to claim 1, wherein:

the detector detects a signal-to-noise ratio around the device, and the controller controls the voice recognition timing based on the signal-to-noise ratio around the device detected by the detector.

5. The voice recognition device according to claim 3, wherein, in a case where the volume of the noise among the sound around the device detected by the detector is at least a predetermined threshold volume, an adjuster makes adjustment amounts of a timing of utterance start and a timing of utterance end be small compared to a case where the volume of the noise is smaller than the predetermined threshold volume.

6. The voice recognition device according to claim 1, wherein the controller determines the timing of utterance start, to which the gap adjustment amount calculated by the calculator is added, as the start timing of voice recognition, and determines the timing of utterance end, to which the gap adjustment amount is added, as the end timing of the voice recognition, in a case where a volume of the noise among the sound around the device detected by the detector is at least a predetermined threshold volume.

7. The voice recognition device according to claim 1, wherein the controller controls a voice recognition interval based on the voice recognition timing.

8. The voice recognition device according to claim 1, wherein the detector detects the sound around the device by targeting a sound other than a sound within a frequency range of a voice of the utterer.

9. A robot equipped with the voice recognition device according to claim 1.

10. A voice recognition method comprising:
recognizing a movement of a mouth of an utterer;
detecting a voice of the utterer among a sound around a device;
generating an utterance determination identifier corresponding to the utterer in advance by performing labeling of utterance or non-utterance to a lip image of the utterer which is synchronized with the detected voice of the utterer;
controlling a voice recognition timing based on the movement of the mouth of the utterer recognized in the recognizing and the voice of the utterer detected in the detecting; and
determining whether the lip image of the utterer corresponding to the utterance determination identifier is an image during the utterance or an image not during the utterance by using the generated utterance determination identifier,
wherein in the recognizing, at least one of a timing of utterance start of the utterer and a timing of utterance end is recognized based on the movement of the mouth from the lip image of the utterer and a determination result of the determining.

11. The voice recognition method according to claim 10, wherein, in the controlling, the voice recognition timing is controlled by determining the timing of utterance start recognized by the recognizing as a start timing of the voice recognition and determining the timing of utterance end as an end timing of the voice recognition.

12. The voice recognition method according to claim 10, wherein, in the generating, the utterance determination identifier is generated by performing machine learning of a plurality of the lip images to which the labeling of utterance or non-utterance is performed.

13. A voice recognition method which is executed by a voice recognition device, the method comprising:
recognizing a movement of a mouth of an utterer;
detecting a noise among a sound around the device;
calculating a gap adjustment amount for adjusting a gap regarding a timing of utterance start of the utterer and/or a gap regarding a timing of utterance end of the utterer based on the noise among the sound around the device detected in the detecting; and
controlling a voice recognition timing based on the movement of the mouth of the utterer recognized in the recognizing and the noise among the sound around the device detected in the detecting,
wherein the controlling comprises determining the timing of utterance start, to which the gap adjustment amount calculated in the calculating is added, as a start timing of voice recognition, and determining the timing of utterance end, to which a gap adjustment amount is added, as an end timing of the voice recognition.

14. A non-transitory storage medium storing a program which is readable by a computer, the program being executable to control the computer to perform functions comprising:
recognizing a movement of a mouth of an utterer;
detecting a noise among a sound around a device;
calculating a gap adjustment amount for adjusting a gap regarding a timing of utterance start of the utterer and/or a gap regarding a timing of utterance end of the utterer based on the noise among the sound around the device detected in the detecting; and
controlling a voice recognition timing based on the movement of the mouth of the utterer recognized in the recognizing and the noise among the sound around the device detected in the detecting,
wherein the controlling comprises determining the timing of utterance start, to which the gap adjustment amount calculated in the calculating is added, as a start timing of voice recognition, and determining the timing of utterance end, to which a gap adjustment amount is added, as an end timing of the voice recognition.

* * * * *